May 8, 1923.

W. H. SMITH

RESILIENT WHEEL

Original Filed Jan. 26, 1922

1,454,342

Inventor

William H. Smith

By *F. K. Bryant*

Attorney

Patented May 8, 1923.

1,454,342

UNITED STATES PATENT OFFICE.

WILLIAM H. SMITH, OF BRIDGEPORT, CONNECTICUT.

RESILIENT WHEEL.

Application filed January 26, 1922, Serial No. 531,960. Renewed October 7, 1922. Serial No. 593,122.

*To all whom it may concern:*

Be it known that I, WILLIAM H. SMITH, a citizen of the United States of America, residing at Bridgeport, in the county of Fairfield and State of Connecticut, have invented certain new and useful Improvements in Resilient Wheels, of which the following is a specification.

This invention relates to an improved resilient wheel particularly of the kind used in connection with motor driven vehicles, especially trucks and the like, and an object of the invention is to provide a substitution for generally used pneumatic tires.

Another object involves the provision of a pair of rim members, one secured on the felly, and the other being pliable and spaced from and surrounding the first named rim member, resilient means being disposed between the two rim members, and rotating members being provided for the resilient means, said foregoing parts being so constructed as to withstand all lateral strains, as well as the strain created on the parts due to the driving connection between tread rim and the felly rim.

Still another object consists in the provision of means for retaining the resilient means in their necessary circumferential arrangement with respect to the rim band and the tread band, in combination with means for holding the resilient means uniformly spaced and which latter means also acts as a circumferential driving medium between the springs and the rim band or members of the wheel.

With the above general objects in view and others that will appear as the nature of the invention is better understood, the same consists of the novel form, combination and arrangement of parts hereinafter more fully described, shown in the accompanying drawing and claimed.

Figure 1:
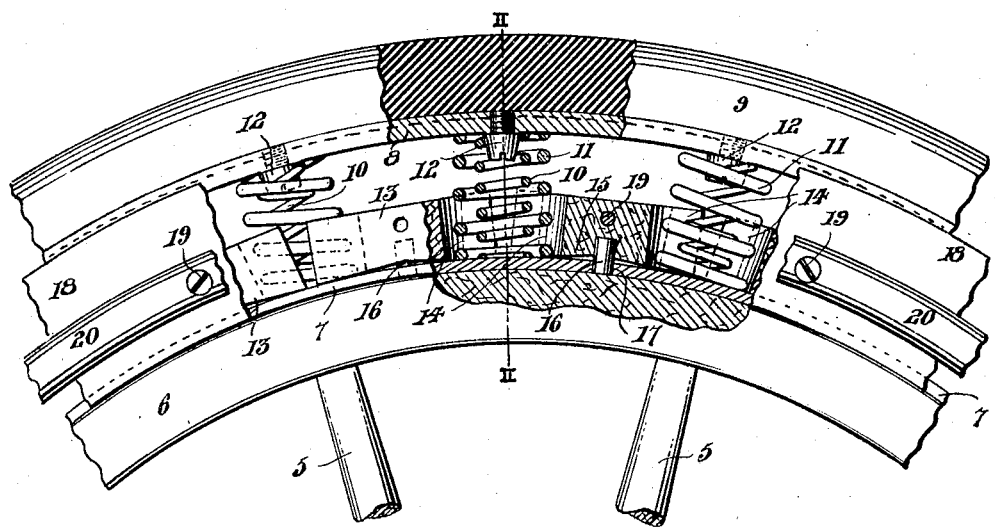
Figure 2:
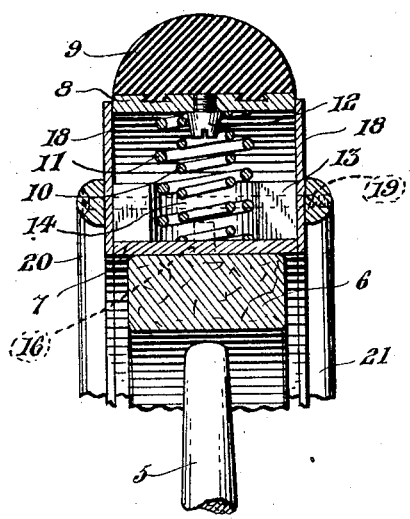
Figure 3:
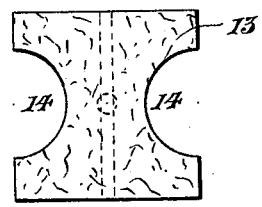
Figure 4:
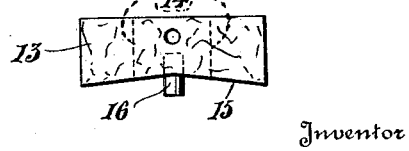

In the drawing, wherein like reference characters designate corresponding parts throughout the several views, Figure 1 is a fragmentary view partly in section and partly in side elevation, of a resilient vehicle wheel constructed in accordance with the present invention, Figure 2 is a radial sectional view taken substantially upon line II—II of Fig. 1, Figure 3 is a plan view of one of the spacing members or blocks employed in the wheel shown in Figs. 1 and 2, and Figure 4 is an end elevational view of the spacing block shown in Fig. 3.

Referring more in detail to the several views, the present invention consists of a resilient wheel which may embody the usual radial spokes 5 connected to and surrounded by the usual wooden felly 6.

In accordance with the present invention, a rim band 7 is suitably fastened on the outer surface of the felly 6, preferably permanently, and this band is of slightly greater width than the felly 6 so that said band 7 extends slightly beyond the side faces of the felly at each side as shown clearly in Fig. 2. A resilient flexible tread rim or band 8 is arranged in spaced relation to the band 7 and surrounds the latter as shown clearly in Figs. 1 and 2, said tread band being preferably provided with a solid cushion tread member or tire tread 9 of rubber or the like. The tread member 9 may be placed on the tread rim 8 in such manner as to be capable of being renewed from time to time when found necessary, and the two rims 7 and 8 are of substantially the same width.

The rim members 7 and 8 are normally yieldingly held in concentric relation by means of a series of spring elements, each of which preferably consists in a pair of concentric helical springs 10 and 11 radially arranged so as to abut the inner face of the rim 8 and the outer face of the rim 7 as shown in Figs 1 and 2. The spring elements consisting of the springs 10 and 11 are preferably uniformly spaced about the circumference of the rim 7 and the outer spring 11 of each spring element is preferably formed of larger diameter wire than the inner spring 10 thereof.

The rim 8 is provided with a plurality of inwardly directed studs 12, each of which is disposed to project into the outer end of the inner spring 10 of one spring element as shown in Fig. 1, and these studs are preferably removable by being threaded into suitable openings provided in said tread rim 8. The heads of the studs 12 are preferably tapered so that the springs may flex in all directions without obstruction and at the same time the engagement of the spring 10 with the heads of the studs 12 insure a sufficiently positive driving connection to prevent displacement of the spring elements.

A plurality of spacing blocks 13 are disposed upon the outer surface of the inner rim 7 as shown in Fig. 1, and these blocks are provided with semi-circular cutouts as at 14 in the opposite ends thereof so that when the blocks are placed upon the rim in end to end relation, substantially circular sockets are provided into which the inner ends of the spring elements project. The blocks 13 are preferably provided with V-shaped inner surfaces as at 15 so that said blocks will rest upon the outer surface of the inner rim 7 substantially at the ends thereof only and in this way rocking of the blocks is prevented. The blocks 13 are held against circumferential movement by means of dowel pins 16 which are suitably fastened in sockets provided centrally of the inner faces of the blocks 13, and which project into suitable openings provided in the inner rim 7 as at 17. It will thus be seen that the spring elements are effectively connected to the inner and outer rims so as to provide a driving connection and to prevent relative displacement of the rims and the spring elements.

An annular guide flange 18 is provided at each side of the rim so as to close the space between the two rims for the exclusion of dust and the like, and as will presently appear, to form a guide so as to prevent lateral displacement of the outer rim 8. The guide flanges 18 are effectively rigidly connected to the inner rim 7 and spacer blocks 13 by means of transverse bolts 19 which pass through suitable openings in said blocks and in the guide flanges 18, the guide flanges being effectively secured against the side edges of the inner rim 7 and the blocks 13 and fixed thereto. In the normal position of the parts, the outer margins of the guide flanges 18 slidably engage the side edges of the outer rim 8 so that inward movement of the outer rim 8 will be permitted while lateral displacement of said rim will be effectively prevented. In order to make the structure as light as possible, the guide flanges 18 are necessarily formed from relatively thin material, and in order that said guide flanges may be effectively bolted in position, the bolts 19 pass through suitable openings provided in annular rings 20 and 21 which are disposed against the outer faces of the guide flanges 18, the heads of the bolts 19 being countersunk in the outer surface of the ring 20 and the opposite ends of said bolts being threaded into the openings of the ring 21. By this construction the bolts have no projecting portions and the rings 20 and 21 preferably have their outer surfaces rounded for effectively preventing damage by engagement of the same with a curb or the like.

By viewing Figure 1, it will be noted that the blocks may be slightly spaced and as the blocks are placed upon the circular rim 7, the sockets which receive the spring elements and which are produced by the opposed cutouts 14 have their walls inwardly converging so as to permit slight lateral play of the spring elements in all directions whereby effective spring action is obtained.

In operation, the rim 8 will flex at that portion of the same which is adjacent the ground when the load is placed upon the wheel, and the adjacent spring element will resist such displacement of the rim as takes place to such an extent as to give the action usually accomplished by the ordinary form of pneumatic tire. It will be readily seen that the parts are so constructed and connected as to permit ready repairs whenever found necessary, and it will also be seen that the manner of connecting the parts provides an extremely simple and durable construction capable of meeting with all of the necessary requirements for a successful commercial use.

From the foregoing description it is believed that the construction and operation as well as the advantages of the present invention will be readily understood and appreciated by those skilled in the art.

Minor changes may be made in the present invention without departing from the spirit and scope thereof as claimed.

What is claimed as new is:—

1. In a resilient wheel, a rim adapted to be fastened upon a felly, a tread rim spaced from and surrounding said first named rim, a series of spring elements interposed between the rims and normally maintaining the same in concentric relation, said spring elements each including a pair of concentric radially arranged helical springs; a plurality of spacing blocks arranged upon the outer surface of the inner rim, said spacing blocks being provided with opposite semi-cylindrical cutouts in the ends thereof forming substantially cylindrical pockets which receive the inner ends of said spring elements, annular guide flanges closing the space between said rims and having their outer margins slidably engaging the side edges of the tread rim, means engaging the inner rim and carried by said blocks for preventing circumferential creeping of the blocks, and removable means for rigidly fastening said annular guide flanges against the side edges of the inner rim and said spacing blocks.

2. In a resilient wheel, a pair of rims, spring elements interposed between said rims and normally maintaining the same in spaced concentric relation, and spacing blocks for said spring elements each having semi-cylindrical cutouts in the ends of the same whereby adjacent spacing blocks form substantially cylindrical pockets receiving the inner ends of said spring elements, said inner rim carrying a plurality of openings, and dowel pins carried by said blocks and removably engaging in said openings of the inner rim.

3. In a resilient wheel, a pair of rims, spring elements interposed between said rims and normally maintaining the same in spaced concentric relation, spacing blocks for said spring elements each having semi-cylindrical cutouts in the ends of the same whereby adjacent spacing blocks form substantially cylindrical pockets receiving the inner ends of said spring elements, said inner rim carrying a plurality of openings, dowel pins carried by said blocks and removably engaging in said openings of the inner rim, annular guide flanges disposed against the side edges of said rims and spacing blocks, said guide flanges slidably engaging the side edges of the outer rim, and removable bolts passing through said guide flanges and said spacing blocks.

4. In a resilient wheel, a pair of rims, spring elements interposed between said rims and normally maintaining the same in spaced concentric relation, spacing blocks for said spring elements each having semi-cylindrical cutouts in the ends of the same whereby adjacent spacing blocks form substantially cylindrical pockets receiving the inner ends of said spring elements, said inner rim carrying a plurality of openings, dowel pins carried by said blocks and removably engaging in said openings of the inner rim, annular guide flanges disposed against the side edges of said rims and spacing blocks, said guide flanges slidably engaging the side edges of the outer rim, removable bolts passing through said guide flanges and said spacing blocks, and annular rings engaging the outer surfaces of said annular guide flanges, the bolts passing through one of said rings having their heads countersunk therein, and the bolts having their other ends threaded into the other ring.

5. In a resilient wheel, a pair of rims, spring elements interposed between said rims and normally maintaining the same in spaced concentric relation, spacing blocks for said spring elements each having semi-cylindrical cutouts in the ends of the same whereby adjacent spacing blocks form substantially cylindrical pockets receiving the inner ends of said spring elements, said inner rim carrying a plurality of openings, dowel pins carried by said blocks and removably engaging in said openings of the inner rim, annular guide flanges disposed against the side edges of said rims and spacing blocks, said guide flanges slidably engaging the side edges of the outer rim, removable bolts passing through said guide flanges and said spacing blocks, annular rings engaging the outer surfaces of said annular guide flanges, the bolts passing through one of said rings having their heads countersunk therein, and the bolts having their other ends threaded into the other ring, and removable radial inwardly extending studs carried by the outer rim and telescoping into said spring elements.

In testimony whereof I affix my signature.

WILLIAM H. SMITH.